US007939176B2

(12) United States Patent
Sisler et al.

(10) Patent No.: US 7,939,176 B2
(45) Date of Patent: *May 10, 2011

(54) COATED SUBSTRATES AND METHOD OF COATING

(75) Inventors: Gordon Sisler, St Catharines (CA); T. Brian McAneney, Burlington (CA); David Michael Thompson, Webster, NY (US); Michael J. Diehl, Rochester, NY (US); Kurt I. Halfyard, Mississauga (CA); Christine D. Anderson, Hamilton (CA)

(73) Assignee: Xerox Corporation, Norwalk, CT (US)

( * ) Notice: Subject to any disclaimer, the term of this patent is extended or adjusted under 35 U.S.C. 154(b) by 909 days.

This patent is subject to a terminal disclaimer.

(21) Appl. No.: 11/821,355

(22) Filed: Jun. 22, 2007

(65) Prior Publication Data

US 2008/0014513 A1 Jan. 17, 2008

Related U.S. Application Data

(63) Continuation-in-part of application No. 11/278,754, filed on Apr. 5, 2006, now Pat. No. 7,521,165, and a continuation-in-part of application No. 11/275,333, filed on Dec. 23, 2005, now Pat. No. 7,462,401.

(51) Int. Cl.
*B32B 27/00* (2006.01)

(52) U.S. Cl. ..... 428/500; 428/480; 428/327; 430/126.1; 430/126.2

(58) Field of Classification Search .................. 428/500, 428/480, 372.2, 372; 430/126.1, 126.2
See application file for complete search history.

(56) References Cited

U.S. PATENT DOCUMENTS

| | | | | |
|---|---|---|---|---|
| 3,590,000 | A | 6/1971 | Palermiti et al. | 252/62.1 |
| 4,070,262 | A | 1/1978 | Guarino et al. | 204/159.24 |
| 4,071,425 | A | 1/1978 | Guarino et al. | 204/159.24 |
| 4,072,592 | A | 2/1978 | Dué et al. | 204/159.15 |
| 4,072,770 | A | 2/1978 | Ting | 427/54 |
| 4,133,909 | A | 1/1979 | Spencer | 427/54 |
| 4,231,593 | A | 11/1980 | Bell, Jr. et al. | 283/6 |
| 4,243,694 | A | 1/1981 | Mansukhani | 427/14.1 |
| 4,265,976 | A | 5/1981 | Nowak | 428/486 |
| 4,265,990 | A | 5/1981 | Stolka et al. | 430/59 |
| 4,390,562 | A | 6/1983 | Yanagisawa | 427/11 |
| 4,558,108 | A | 12/1985 | Alexandru et al. | 526/340 |
| 4,563,408 | A | 1/1986 | Lin et al. | 430/59 |
| 4,584,253 | A | 4/1986 | Lin et al. | 430/59 |
| 4,585,884 | A | 4/1986 | Lin et al. | 556/413 |
| 4,688,050 | A | 8/1987 | Tsao | 346/76 |
| 4,779,558 | A | 10/1988 | Gabel et al. | 118/46 |
| 4,868,083 | A | 9/1989 | Nagatsuka et al. | 430/111.35 |
| 4,891,240 | A | 1/1990 | Ward et al. | 427/11 |
| 4,911,830 | A | 3/1990 | Bromley et al. | 252/301.16 |
| 4,952,293 | A | 8/1990 | Sypula et al. | 204/180.7 |
| 4,954,364 | A | 9/1990 | Stein et al. | 427/54.1 |
| 4,956,221 | A | 9/1990 | Gutek | 428/142 |
| 4,994,299 | A | 2/1991 | Stein et al. | 427/54.1 |
| 5,082,686 | A | 1/1992 | Desorcie et al. | 427/54.1 |
| 5,084,359 | A | 1/1992 | Talvalkar et al. | 428/484 |
| 5,162,389 | A | 11/1992 | Lee et al. | 522/42 |
| 5,219,641 | A | 6/1993 | Mehta et al. | 428/211 |
| 5,223,368 | A | 6/1993 | Ciccarelli et al. | 430/110 |
| 5,227,460 | A | 7/1993 | Mahabadi et al. | 528/272 |
| 5,274,025 | A | 12/1993 | Stockl et al. | 524/513 |
| 5,278,020 | A | 1/1994 | Grushkin et al. | 430/137 |
| 5,290,654 | A | 3/1994 | Sacripante et al. | 430/137 |
| 5,308,734 | A | 5/1994 | Sacripante et al. | 430/137 |
| 5,344,738 | A | 9/1994 | Kmiecik-Lawrynowicz et al. | 430/137 |
| 5,346,795 | A | 9/1994 | Pickering et al. | 430/110 |
| 5,346,797 | A | 9/1994 | Kmiecik-Lawrynowicz et al. | 430/137 |
| 5,348,832 | A | 9/1994 | Sacripante et al. | 430/109 |
| 5,364,729 | A | 11/1994 | Kmiecik-Lawrynowicz et al. | 430/137 |
| 5,366,840 | A | 11/1994 | Larson et al. | 430/115 |
| 5,366,841 | A | 11/1994 | Patel et al. | 430/137 |
| 5,370,963 | A | 12/1994 | Patel et al. | 430/137 |
| 5,403,693 | A | 4/1995 | Patel et al. | 430/137 |
| 5,405,728 | A | 4/1995 | Hopper et al. | 430/137 |
| 5,418,108 | A | 5/1995 | Kmiecik-Lawrynowicz et al. | 430/137 |
| 5,496,676 | A | 3/1996 | Croucher et al. | 430/137 |
| 5,501,935 | A | 3/1996 | Patel et al. | 430/137 |
| 5,510,220 | A | 4/1996 | Nash et al. | 430/106 |
| 5,514,467 | A | 5/1996 | Berkes et al. | 428/329 |
| 5,525,572 | A | 6/1996 | Williams | 503/201 |
| 5,527,578 | A | 6/1996 | Mazurek et al. | 428/41.8 |
| 5,527,658 | A | 6/1996 | Hopper et al. | 430/137 |
| 5,554,480 | A | 9/1996 | Patel et al. | 430/137 |
| 5,585,215 | A | 12/1996 | Ong et al. | 430/107 |
| 5,593,807 | A | 1/1997 | Sacripante et al. | 430/137 |
| 5,627,002 | A | 5/1997 | Pan et al. | 430/115 |
| 5,639,708 | A | 6/1997 | Golemo et al. | 503/205 |

(Continued)

OTHER PUBLICATIONS

Laromer PO 94 F, Coating Raw Materials, BASF Corporation, Aug. 1999.

*Primary Examiner* — Betelhem Shewareged
(74) *Attorney, Agent, or Firm* — Alix, Yale & Ristas, LLP

(57) ABSTRACT

Disclosed herein is a xerographic print comprising a substrate with a toner-based image printed thereon, the printed substrate including low surface tension portions having a surface tension of no more than about 22 mN/m at 25 Deg. C. resulting in a surface tension gradient field on the substrate, the printed substrate being coated with a coating comprising at least one surfactant and a film-forming polymer, the coating having a liquid phase surface tension at 25 Deg. C. not exceeding the surface tension of the low surface tension portions of the printed substrate by more than about 2 mN/m, the coating having substantially no pinholes and being sufficiently resistant to permeation by the fuser oil to exhibit an effective absence of haze 24 hours after application. A system and a method of applying a substantially pinhole-free and haze-free coating substantially immediately after print fusing also are disclosed.

18 Claims, 4 Drawing Sheets

U.S. PATENT DOCUMENTS

| | | | | |
|---|---|---|---|---|
| 5,650,255 | A | 7/1997 | Ng et al. | 430/137 |
| 5,650,256 | A | 7/1997 | Veregin et al. | 430/137 |
| 5,709,976 | A | 1/1998 | Malhotra | 430/124 |
| 5,723,253 | A | 3/1998 | Higashino et al. | 430/166 |
| 5,729,813 | A | 3/1998 | Eddy et al. | 399/333 |
| 5,744,520 | A | 4/1998 | Kmiecik-Lawrynowicz et al. | 523/334 |
| 5,747,215 | A | 5/1998 | Ong et al. | 430/137 |
| 5,763,133 | A | 6/1998 | Ong et al. | 430/137 |
| 5,766,818 | A | 6/1998 | Smith et al. | 430/137 |
| 5,800,884 | A | 9/1998 | D'Anna et al. | 428/35.7 |
| 5,804,349 | A | 9/1998 | Ong et al. | 430/110 |
| 5,826,147 | A | 10/1998 | Liu et al. | 399/237 |
| 5,827,633 | A | 10/1998 | Ong et al. | 430/137 |
| 5,840,462 | A | 11/1998 | Foucher et al. | 430/137 |
| 5,843,579 | A | 12/1998 | Roth et al. | 428/484 |
| 5,853,944 | A | 12/1998 | Foucher et al. | 430/137 |
| 5,858,601 | A | 1/1999 | Ong et al. | 435/137 |
| 5,863,698 | A | 1/1999 | Patel et al. | 430/137 |
| 5,866,637 | A | 2/1999 | Lorenz | 523/161 |
| 5,869,215 | A | 2/1999 | Ong et al. | 430/137 |
| 5,888,622 | A | 3/1999 | Pinell et al. | 428/195 |
| 5,902,710 | A | 5/1999 | Ong et al. | 430/110 |
| 5,910,387 | A | 6/1999 | Mychajlowskjj et al. | 430/110 |
| 5,916,725 | A | 6/1999 | Patel et al. | 430/137 |
| 5,919,595 | A | 7/1999 | Mychajlowskjj et al. | 430/137 |
| 5,925,488 | A | 7/1999 | Patel et al. | 430/137 |
| 5,966,570 | A | 10/1999 | Till et al. | 399/133 |
| 5,977,210 | A | 11/1999 | Patel et al. | 523/161 |
| 6,017,992 | A | 1/2000 | Haddleton et al. | 524/458 |
| 6,140,386 | A | 10/2000 | Vanderhoff et al. | 522/78 |
| 6,177,221 | B1 | 1/2001 | Maniar et al. | 430/108 |
| 6,180,308 | B1 | 1/2001 | Pan et al. | 430/115 |
| 6,187,499 | B1 | 2/2001 | Zhao et al. | 430/119 |
| 6,212,347 | B1 | 4/2001 | Zhao et al. | 399/237 |
| 6,319,647 | B1 | 11/2001 | Gutman et al. | 430/111.41 |
| 6,365,316 | B1 | 4/2002 | Stamp et al. | 430/111.41 |
| 6,416,916 | B1 | 7/2002 | Silence et al. | 430/108.3 |
| 6,743,561 | B2 | 6/2004 | Heeks et al. | 430/124 |
| 6,782,144 | B2 | 8/2004 | Bellavita et al. | 382/310 |
| 6,928,183 | B2 | 8/2005 | Mitchell et al. | 382/139 |
| 6,942,954 | B2 | 9/2005 | Patel et al. | 430/137.1 |
| 6,991,883 | B2 | 1/2006 | Riley et al. | 430/108.21 |
| 7,166,406 | B2 * | 1/2007 | McAneney et al. | 430/126.1 |
| 7,462,401 | B2 * | 12/2008 | Halfyard et al. | 428/500 |
| 2004/0137203 | A1 | 7/2004 | Adams et al. | 428/195.1 |
| 2005/0249895 | A1 | 11/2005 | Sisler et al. | 428/32.34 |
| 2005/0250038 | A1 | 11/2005 | McAneney et al. | 430/124 |
| 2005/0250039 | A1 | 11/2005 | Halfyard et al. | 430/124 |
| 2005/0285918 | A1 | 12/2005 | McElligott et al. | 347/101 |
| 2006/0063868 | A1 | 3/2006 | Janmaat et al. | 524/160 |

* cited by examiner

FIG. 1
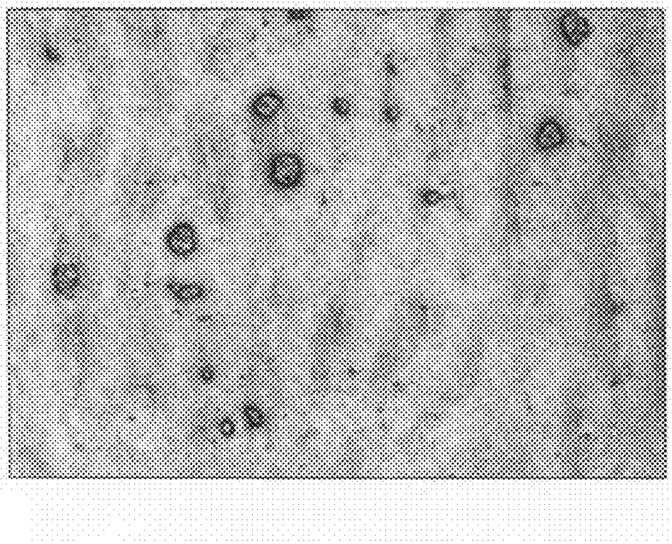
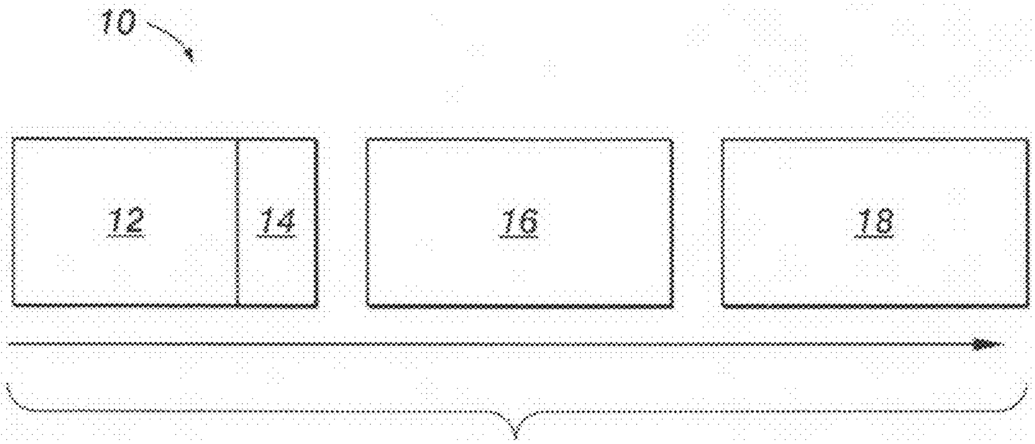
FIG. 2

FIG. 3A
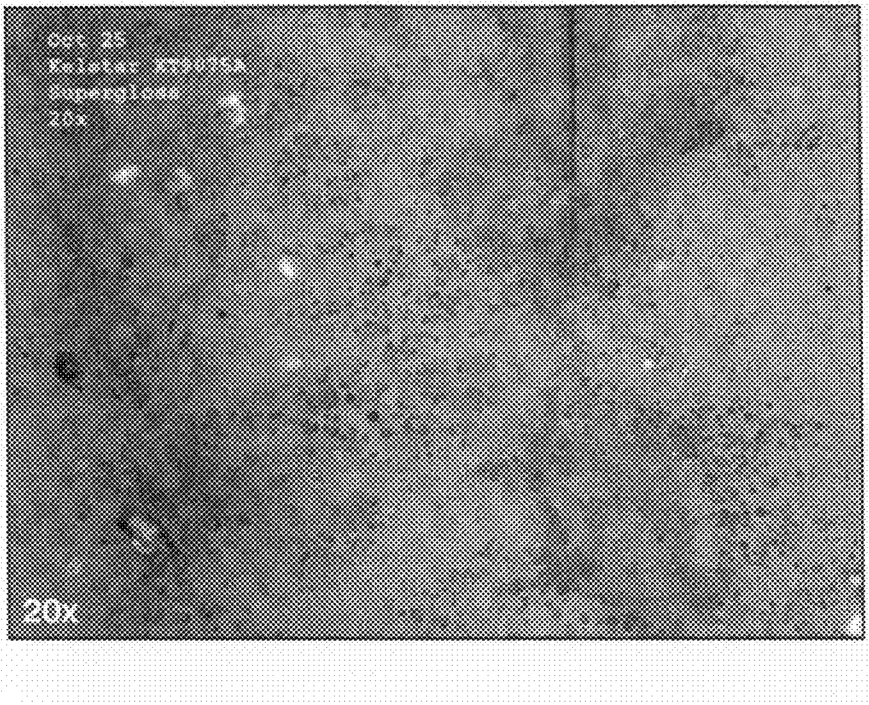
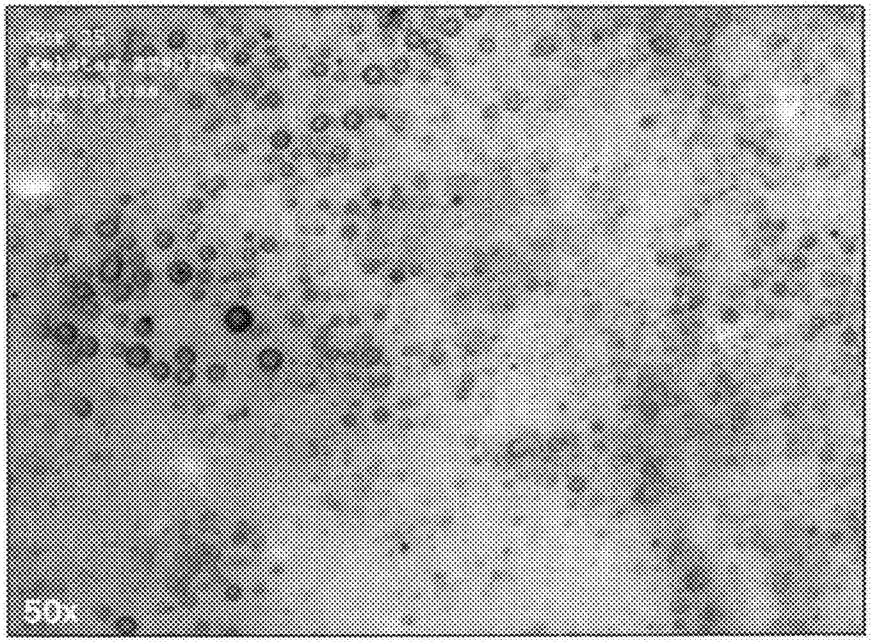
FIG. 3B

FIG. 4A
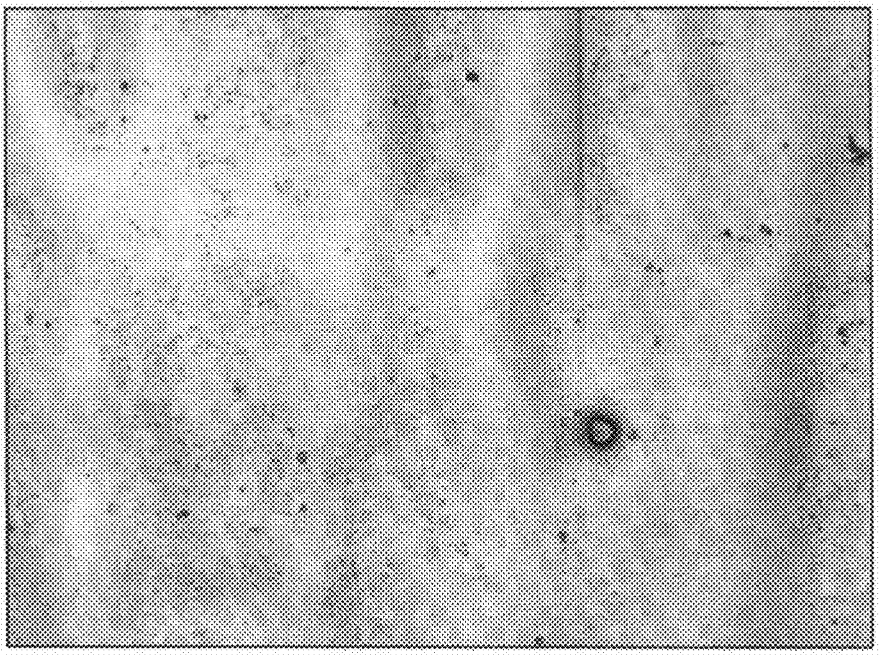
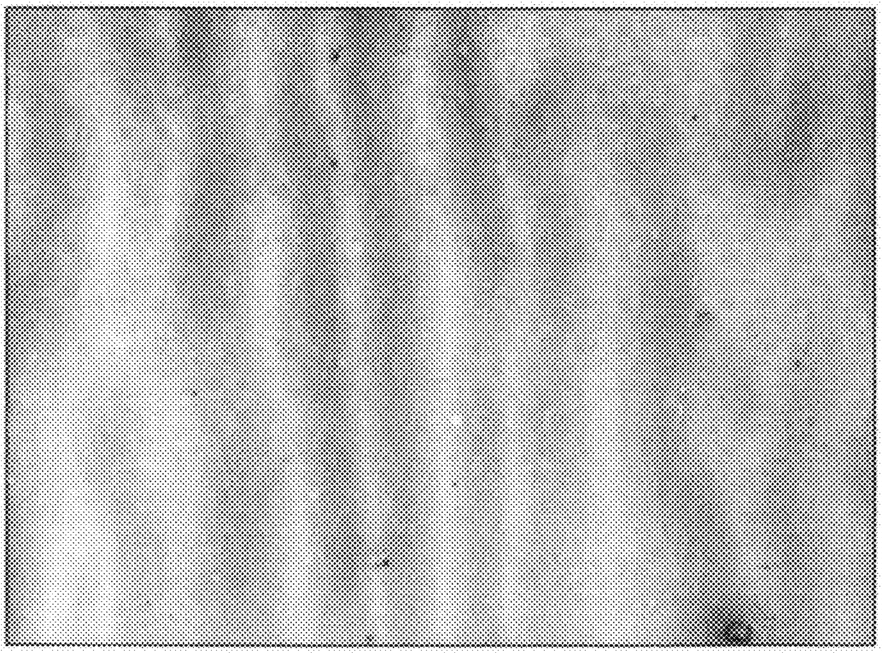
FIG. 4B

COATED SUBSTRATES AND METHOD OF COATING

RELATED APPLICATIONS

This is a continuation-in-part of U.S. application Ser. No. 11/275,333 filed Dec. 23, 2005, now U.S. Pat. No. 7,462,401 B2 and U.S. application Ser. No. 11/278,754, filed Apr. 5, 2006, now U.S. Pat. No. 7,521,165 B2.

BACKGROUND

The embodiments disclosed herein generally relate to coated substrates, efficient application of coating compositions, and systems and methods for analyzing the quality of coating compositions.

Xerographic toners contain thermoplastic resins that are selected in part to ensure adhesion to media in a two roll fusing nip. Fusing takes place at a specified temperature, pressure and dwell time. The fusing conditions may not be consistent with quality standards for image permanence and durability in commercial printing markets. For this reason clear, protective overcoats may be applied over the print using some form of liquid film coating process followed by suitable drying and/or curing. To the extent that the surface of the xerographic print at the time of coating contains residual low surface tension fuser release oil, liquid film coatings will experience a range of surface tension defects known to the industry. One type of defect, referred to as "pin holes," is caused by the presence of oil on the substrate. The oil prevents complete wetting of the substrate by to coating composition. Another kind of defect, referred to as haze, occurs when a coating composition surrounds droplets of oil, resulting in a two phase mixture that is not optically transparent.

In the past, quality problems associated with surface tension defects have been overcome by incorporating a process delay before application of the coating, thereby allowing residual fuser oil to diffuse below the surface. The delay required to overcome surface tension defects in this manner is typically 30 minutes to several hours after fusing. From a process perspective, the delay time necessitates two separate operations—1) production of the fused image and 2) application of the image overcoat. It is required to have a time delay between the two operations because the requisite delay time cannot be accommodated in-line at process speeds of existing Xerographic engines.

It would be useful to develop a more efficient method and system for producing the fused image and applying a protective coating.

SUMMARY

One embodiment is a xerographic print comprising a substrate with a toner-based image printed thereon, the printed substrate including low surface tension portions having a surface tension of no more than about 22 mN/m at 25 Deg. C. resulting in a surface tension gradient field on the printed substrate, the printed substrate being coated with a coating comprising at least one surfactant and a film-forming polymer, the coating having a liquid phase surface tension at 25 Deg. C. not exceeding the surface tension of the low surface tension portions of the printed substrate by more than about 2 mN/m, the coating having substantially no pinholes and being sufficiently resistant to permeation by the fuser oil to exhibit an effective absence of haze 24 hours after application.

Another embodiment is a system for coating a printed image comprising an imager configured to print a xerographic image on a substrate, the imager including a fuser using fuser oil, and a coater configured to coat the printed image substantially immediately after printing with a coating having substantially no pinholes and an effective absence of haze 24 hours after application.

A further embodiment is a method comprising forming a toner-based image on a substrate in a process employing a fuser that uses fuser oil, the substrate having a surface tension gradient field, and forming a coating over the toner-based image within five minutes after forming the toner-based image, the coating comprising at least one film-forming polymer and at least one surfactant and having a liquid phase surface tension at 25 Deg. C. not exceeding the lowest surface tension of the substrate by more than 2 mN/m, the coating having substantially no pinholes and an effective absence of haze 24 hours after application.

Yet another embodiment is a method of applying a coating substantially free of film irregularities to a toner-based image within a period of 50 ms to 300 s from the time the toner-based image exits a fuser, the surface tension of a portion of the toner-based image and related non-image area having been substantially reduced by the presence of low surface tension oil, the method comprising printing and fusing the toner-based image, applying a liquid film-forming polymer coating containing a high level of surfactant over the image, and curing the coating, wherein printing, fusing, coating and curing take place in a single production line.

BRIEF DESCRIPTION OF THE DRAWINGS

FIG. 1 is a photomicrograph at a magnification of 100× showing defects in a coating.

FIG. 2 depicts a system and method of coating a printed substrate according to embodiments disclosed herein.

FIGS. 3A (200×) and 3B (500×) show different magnifications of a coating having surface defects.

FIG. 4A is a photomicrograph at a magnification of 100× showing a coating with surface defects.

FIG. 4B is a photomicrograph at a magnification of 100× showing a coating that does not have surface defects.

DETAILED DESCRIPTION

Figure 5:
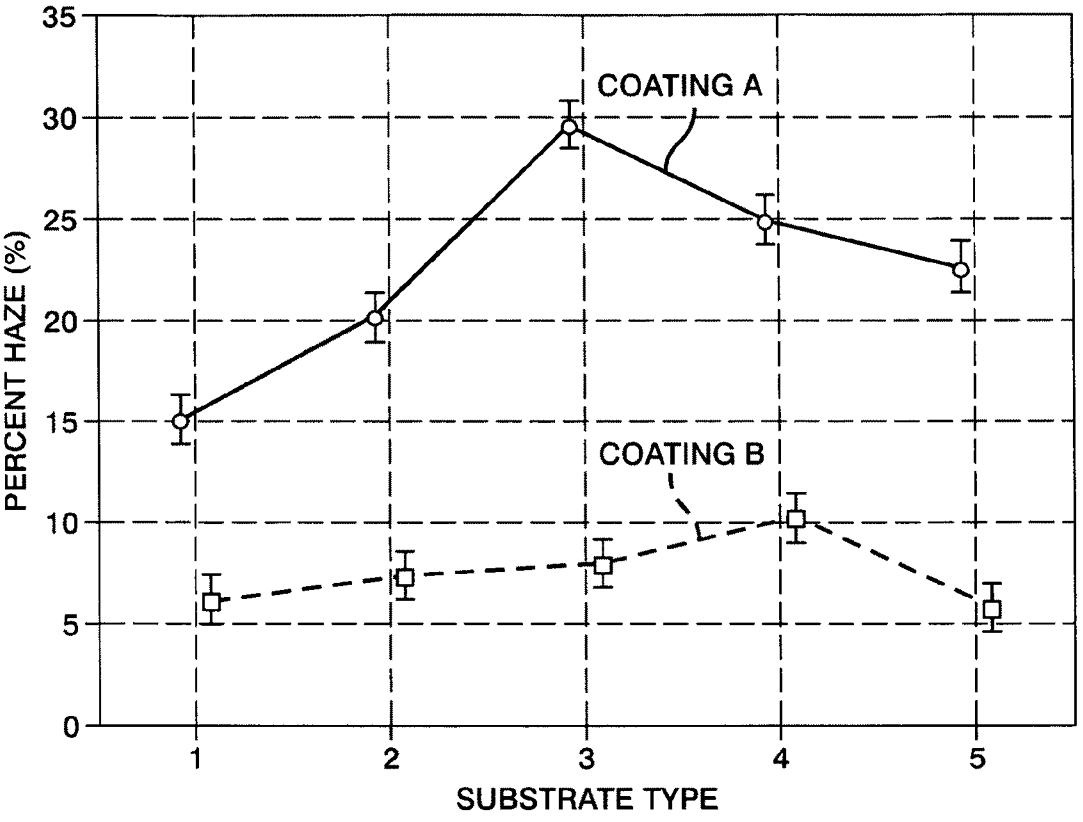
FIG. 5 is a graph showing % haze for the coatings depicted in FIGS. 4A and 4B.

A printed substrate having a coating formed thereon that is substantially free of pinholes and haze defects is described herein. The coating is formed from a surfactant and a film-forming polymer. The coating has a liquid phase surface tension that is no more than about 2 mN/m higher than, and usually is less than, the surface tension of the lowest surface tension portions of the image and substrate.

Some of the disclosed embodiments provide a system and method of coating a toner image. The system and method provide a coating that can be applied within a time period of 50 ms to 300 s after exit from a fuser. In one embodiment, the coating comprises a fluid formulation containing a combination of acrylated oligomers and photoinitiators, and in particular a high loading of polyether modified polydimethylsiloxane type surfactant. The surfactant lowers surface tension enough to allow the contaminated surface to wet. Even when applied shortly after fusing, these formulations prevent haze and pinhole sized dewetting defects. The coating composition is applied to a fuser-oil-contaminated surface of a xerographic print via a coating device that is in-line with a Xerographic print engine employing a low surface tension release fluid. In some embodiments, the coating is cured using high intensity radiation to initiate polymerizaton (curing) of the fluid. In other embodiments, the coating comprises a latex emulsion combined with one or more surfactants.

Incorporation of a delay in a coating process is inconvenient in many commercial printing applications. In Xerographic publishing, for example, processes are already in place to allow integrated printing of text and cover on the same engine, proceeding to in-line binding. In this configuration a requirement to remove the covers from the process stream in order to to apply overcoat protection in a separate process is inefficient and therefore not a desirable option. Furthermore, in the printing of packaging materials, the scoring, die-cutting and folding of the packages is accomplished following printing. Overcoat image protection often is desired for package scuff-resistance and durability. The overcoat is applied to the whole image sheet prior to die-cutting and thus in-line coating is desired. In contrast, if packages are removed from the process stream for overcoat image protection and then re-inserted for subsequent die-cutting and eventual filling, the possibility of packages being incorrectly filled becomes a quality parameter that must be monitored.

Another embodiment is a system and method for detecting coating defects. In this process, substrates having unabsorbed fuser oil thereon are coated using an in-line coater and are then tested for pinholes and haze.

The systems and methods described herein are particularly useful in printing applications that have one or more of the following application characteristics:

Product application requires multiple post-print finishing steps,

Overcoat image protection is one of the finishing steps and it must be an intermediate, not final, step; typically it is the first post-print finishing step, and In-line manufacture at printing process speed from print through each finishing step is an advantage for the application, as determined by economics, just-in-time delivery, product integrity, etc.

As used herein, "fuser oil" refers to oil employed in the fusing stage of printing that remains on the substrate after fusing. As used herein, the phrase coating "substantially immediately after printing" means coating within 300 seconds after fusing. A "pinhole" as used herein is a tiny hole where the coating does not cover the substrate or where the coverage of the coating material is very thin compared to adjacent areas. The term "haze" as used herein refers to a difference in specular gloss between two measurement geometries. The term "printer" as used herein encompasses any apparatus, such as a digital copier, bookmaking machine, facsimile machine, multi-function machine, etc. that performs a print outputting function for any purpose.

In the early stages of development of the systems and methods described herein, it was observed that a wide range of commercially available coatings, both UV curable and emulsion-based aqueous, resulted in unsatisfactory coating quality when applied immediately over a printed image containing residual fuser oil. The defects were classified as "surface tension related" as this term is understood in the coating industry, cf. *Liquid Film Coating*, ed. Kistler and Schweizer, 1997 pp 184-196. The embodiments described herein overcome these defects.

FIG. 1 is a micrograph showing a commercially available UV curable overcoat applied in a simulated in-line coater in which prints delivered from a Xerox iGen3 fuser subsystem are hand-fed within 3 s to a laboratory gravure offset coater (manufactured by Euclid Coating Systems) where a curable coating is applied and cured under UV lamps. The conspicuous dark circles, typically 30-200 microns in diameter and often approximately 70 micron diameter, are "pinholes." Pinholes are areas of coating retraction associated with low surface tension domains on the fuser oil contaminated substrate. The fuser oil typically is present in domains ranging from molecular size to less than 1 cm. Investigation of the finer scale grainy or speckled appearance on the surface indicates that there are also small domains of fuser oil in the coated film. These fuser oil domains have a surface tension of no more than about 22 mN/m at 25 Deg. C. while the surface tension of the portions of the substrate and images not covered by fuser typically may be as high as 40 mN/m. It is believed that the oil phase domains on this fine scale cause haze and are a time dependent defect, i.e. haze emerges on time scale of minutes to hours after coating. It has been determined that a commercially usable coating must not only be essentially free from pinholes but also must not develop haze at a later time after coating.

The elimination of both haze and dewetting defects has been achieved in part by increasing the surfactant loading in the formulation to a level which is higher than the conventional loading levels of 0.2-0.6% total formulation and providing a combination of components that result in a coating that is not easily permeated by fuser oil. The embodiments described herein use surfactant loadings on the order of 3 wt % of the total formulation of UV curable systems or 0.7 wt % of the total formulation of a latex based system to lower the surface tension below about 24 mN/m. Other formulations, such as fluorosurfactants, can also lower surface tension below about 24 mN/m, but do not necessarily achieve complete wetting or defect elimination when used alone if the coating is applied substantially immediately after fusing.

The surface tension gradient field on a xerographic print involving a substrate, toner-based image and low surface tension release oil is believed to be highly complex in terms of domain scale and distribution, particularly in those cases involving high gloss coated substrates and amino-functionalized polydimethylsiloxane fuser release oils, a commercially important class of prints for color production digital printing protected with UV-curable coatings. A successful coating, as described herein, must wet uniformly, that is without pinholes or haze, across these surface tension gradient fields. To accomplish this, the coating must resist film-thinning mechanisms as described, for example, in *Liquid Film Coating*, ed. Kistler and Schweizer, Chapman and Hall, 1997. Causes of film-thinning relevant to the embodiments described herein are (a) surface tension gradients associated primarily with the presence of fuser oil domains, and additionally (b) drainage due to capillary driven flow originating from surface pores or roughness. The customary strategy for successful coating is to eliminate sources of film-thinning. The embodiments described herein, recognizing many applications of xerographic printing where that is neither practical nor possible, instead provides examples of coating formulations that will perform successfully in the presence of surface tension gradient and capillary driven flow film-thinning mechanisms. The rule followed in this disclosure can be summarized as follows— a) Surface tension of the coating is not to exceed the lowest surface tension of the substrate components which is about 22 mN/m at 25 Deg. C. by more than about 2 mN/m at 25 Deg. C;

b) Coatings meeting this condition must be evaluated for pinholes and haze as described herein to select the subclass of successful coatings.

Referring next to FIG. 2, a system for in-line coating of an image is shown and is designated as 10. A printer 12 xerographically prints an image on media. The image is fixed using a fuser 14 that employs fuser oil. The media containing the printed image is then automatically conveyed to a coater 16 where an overcoat is applied substantially immediately after fusing. The coated media is then automatically conveyed to a curing station 18. The curing station can include a UV lamp, which will provide UV radiation to initiate the curing of UV coatings and heat to dry aqueous coatings. When the system is designed only for non-UV curable coatings, an alternative heat source can be used.

The coatings to be used in this integrated system are 100% solids UV curable coatings or latex based coatings. They are used in conjunction with a two roll nip fuser employing functionalized polydimethylsiloxane fuser release oil, with application of the liquid film coating to the xerographic print within a time period of 50 ms to 300 s from the exit of the fusing nip. The coated print has uniform wetting, with no evidence of pinholes, fisheyes, reticulation or other surface tension related defects. The coating is substantially haze free. In the case of 100% solids curable systems and also latex systems, a time dependent haze has been observed for many unsuccessful coatings. The haze is believed to be caused by the movement of fuser oil droplets in the coating film. The haze usually develops within minutes or hours after coating.

Suitable coating techniques include but are not limited to those using a roll transfer device. For example, coating can be offset gravure, reverse gravure, multi-roll film transfer, rod, air knife, knife and roll, knife and blade, or slot coating.

High Solids UV Curable Coating Compositions

100% solids UV curable coating compositions are described in commonly assigned U.S. application Ser. No. 11/275,333 filed Dec. 23, 2005, the contents of which are incorporated herein by reference in their entirety. The coating compositions comprise, in general, at least one radiation curable oligomer, at least one photoinitiator, and at least one surfactant. The radiation curable oligomer comprises a radiation curable, such as UV curable, polyester polyol derived oligomer, or a mixture of two or more such radiation curable, such as UV curable, polyester polyol derived oligomers. The term "polyester polyol derived oligomer" refers, for example, to polyester polyol oligomers that are modified with other functional groups, such as (alkyl)acrylate groups, halogens, heteroatoms, other alkyl groups, aryl groups, amino groups, or the like. More specifically, the coating compositions comprise at least one (alkyl)acrylate-modified polyester oligomer, at least one UV-photoinitiator used to initiate the photopolymerization (curing) of the at least one (alkyl)acrylate-modified polyester oligomer, and at least one surfactant. The term "(alkyl)acrylate-modified" refers, for example, to the use of acrylate or alkylacrylate as a modifying group for the polyester polyol. For example, the term "(meth)acrylate" refers to the use of acrylate or methacrylate as a modifying group for the polyester polyol.

In embodiments, the (alkyl)acrylate-modified polyester oligomer can be used as the only polymerizable monomer or oligomer in the composition. In these oligomers, the alkyl group, when present, can be of any suitable chain length such as from one to about 40 carbon atoms, such as from 1 to about 20 or from 1 to about 10 carbon atoms, including methyl, ethyl, propyl, and the like, and where the alkyl group can be linear or branched and can be unsubstituted or substituted, for example, by halogens, heteroatoms, other alkyl groups, aryl groups, amino groups or the like. In such embodiments, the (alkyl)acrylate-modified polyester oligomer can be used singly, or in a mixture of two or more (alkyl)acrylate-modified polyester oligomers, as desired. In other embodiments, the (alkyl)acrylate-modified polyester oligomer or a mixture of two or more such (alkyl)acrylate-modified polyester oligomers can be used in combination with other suitable polymerizable monomer(s) or oligomer(s), to achieve specific desired properties.

The (alkyl)acrylate-modified polyester oligomer can be formed, for example, by reacting (alkyl)acrylic acid with a polyester. For example, a (meth)acrylate-modified polyester can be prepared by reacting (meth)acrylic acid with a polyester prepolymer or polymer that is obtained from polyol such as ethylene glycol or 1,6-hexanediol and polybasic acid such as phthalic acid or adipic acid. Such (alkyl)acrylate-modified polyester oligomers such as (meth)acrylate-modified polyester oligomer can be prepared as such, or can be obtained from various commercial sources. For example, various commercially available (meth)acrylate-modified polyester oligomers include EB80, EB81, EB83, EB800, EB809, EB810, EB1870, and EB2870 (available from Cytec Surface Specialties), and CN292 or CN704 (available from Sartomer Company Inc.). Of course, other oligomers can also be used.

In embodiments, the (alkyl)acrylate-modified polyester oligomer can have a single (alkyl)acrylate group, or it can be multi-functional by having more than one such group. For example, the (meth)acrylate-modified polyester oligomer can have two or more (meth)acrylate groups, such as two to about ten or more, or two to about five. In embodiments, the (meth) acrylate-modified polyester oligomer can have, on average, about two and a half to four (meth)acrylate groups. Exemplary multi-functional (meth)acrylate-modified polyester oligomers include those commercially available from Cytec Surface Specialties under the trade name Ebecryl (Eb): Eb40 (tetrafunctional acrylated polyester oligomer), Eb80 (polyester tetra-functional (meth)acrylate oligomer), Eb81 (multifunctional (meth)acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (difunctional bisphenol-A oligomer acrylate), Eb3604 (multifunctional polyester acrylate oligomer), Eb6602 (trifunctional aromatic urethane acrylate oligomer), EBB301 (hexafunctional aliphatic urethane acrylate), Eb8402 (difunctional aliphatic urethane acrylate oligomer), and mixtures thereof.

In embodiments, the (meth)acrylate-modified polyester oligomer has an average molecular weight (Mw) of from about 400 to about 4000, although other materials can also be used.

An (alkyl)acrylate-modified polyester oligomer can also function as a viscosity reducer, as a binder when the composition is cured, and as an adhesion promoter, and as a crosslinking agent, for example. Suitable oligomers can possess a low molecular weight, low viscosity, and low surface tension and comprise functional groups that undergo polymerization upon exposure to UV light.

The coating compositions also comprise at least one photoinitiator, such as at least one UV-photoinitiator. The photoinitiator is selected to initiate the photopolymerization (curing) of the at least one (meth)acrylate-modified polyester oligomer upon exposure to the activating energy. In embodiments, the photoinitiator or mixture of photoinitiators can be included in any suitable and effective amount, such as about 3 to about 6% by weight, although other amounts can be used.

Suitable photoinitiators are UV-photoinitiators, including, for example, hydroxycyclohexylphenyl ketones, benzoins, benzoin alkyl ethers, benzophenones, trimethylbenzoylphenylphosphine oxides, azo compounds, anthraquinones and substituted anthraquinones, such as, for example, alkyl substituted or halo substituted anthraquinones, other substituted or unsubstituted polynuclear quinones, acetophones, thioxanthones, ketals, acylphosphines, and mixtures thereof. In these compounds, the alkyl groups can have any suitable chain length of, for example, 1 to about 40 carbon atoms, can be linear or branched, and can be unsubstituted or substituted such as by halogens, heteroatoms, other alkyl groups, aryl groups, or the like. Specific suitable photoinitiators include, for example, a hydroxyclyclohexylphenyl ketone, such as, for example, 1-hydroxycyclohexylphenyl ketone, such as, for example, Irgacure® 184 (Ciba-Geigy Corp., Tarrytown, N.Y.); a trimethylbenzoylphenylphosphine oxide, such as, for example, ethyl-2,4,6-trimethylbenzoylphenylphosphinate, such as, for example, Lucirin® TPO-L (BASF Corp.); and mixtures thereof.

The coating compositions also comprise at least one surfactant. The surfactant is generally used to lower the surface tension of the composition to allow wetting and leveling of the substrate surface, if necessary, before curing. The surfactant is advantageously used for compositions that are applied to fuser oil-wetted substrates, because the surfactant can lower the surface tension of the coating to allow wetting of the fuser-oiled substrates. In an embodiment, the surfactant or mixture of surfactants can be included in any suitable and effective amount to result in the necessary surface tension, such as about 1 to about 4% by weight, although other amounts can be used.

Any combination of surfactants that has the capability of allowing a coating formulation to wet the fuser-oiled substrates and not result in haze may be used. Exemplary surfactants include, but are not limited to, fluorinated alkyl esters, polyether modified polydimethylsiloxanes, such as, for example, BYK®-UV3510 (BYK Chemie GmbH, Wesel, Germany), and BYK®-348 (BYK Chemie GmbH), such as, for example, BYK®-UV3510 (BYK Chemie GmbH, Wesel, Germany) and BYK®-348 (BYK Chemie GmbH), and fluorosurfactants, such as, for example, Zonyl® FSO-100 (E.I. Du Pont de Nemours and Co., Wilmington, Del.), having the formula $R_fCH_2CH_2O(CH_2CH_2O)_xH$, wherein $R_f$=F $(CF_2CF_2)_y$, x=0 to about 15, and y=1 to about 7.

Optional additives can also be included in the coating composition, such as to provide their known effects. For example, suitable optional additives include light stabilizers, UV absorbers (which absorb incident UV radiation and convert it to heat energy that is ultimately dissipated), antioxidants, optical brighteners (which can improve the appearance of the image and mask yellowing), thixotropic agents, dewetting agents, slip agents, foaming agents, antifoaming agents, flow agents, silica, waxes, oils, plasticizers, binders, electrical conductive agents, fungicides, bactericides, organic and/or inorganic filler particles, leveling agents (such as agents that create or reduce different gloss levels), opacifiers, antistatic agents, dispersants, colorants (such as pigment, dye, mixtures of pigment and dye, mixtures of pigments, mixtures of dyes, and the like), and the like. The composition may also include an inhibitor, such as a hydroquinone, to stabilize the composition by prohibiting or, at least, delaying, polymerization of the oligomer and monomer components during storage, thus increasing the shelf life of the composition. However, additives may negatively effect cure rate, and thus care should be taken when formulating a coating composition using optional additives.

The ability of the composition to wet the substrate generally depends on its viscosity and surface tension. For example, if the surface tension is low, then the surface area covered by the composition will be high resulting in sufficient wetting of the substrate. Exemplary composition formulations have a surface tension of from about 15 mN/m to about 22 mN/m, such as from about 18 mN/m to about 21 mN/m, as measured at about 25° C. A particular exemplary surface tension is about 20 mN/m as measured at about 25° C.

The viscosity of the compositions in embodiments can be for example, from about 50 cP to about 1000 or 3000 cP at a temperature ranging from about 20° C. to about 30° C. such as 25° C. In embodiments, an exemplary viscosity is about 100-200 cP at about 25° C.

Aqueous Latex Coating Compositions

Suitable aqueous latex coatings are described in commonly assigned U.S. application Ser. No. 11/278,754, filed Apr. 5, 2006, the contents of which are incorporated herein by reference in their entirety. In embodiments, the latex emulsion may include styrene/acrylic emulsions, acrylic emulsions, polyester emulsions or mixtures thereof.

Examples of acrylic latex emulsions include poly(alkyl methacrylate-alkyl acrylate), poly(alkyl methacrylate-aryl acrylate), poly(aryl methacrylate-alkyl acrylate), poly(alkyl methacrylate-acrylic acid), and poly(alkyl acrylate-acrylonitrile-acrylic acid); the latex contains a resin selected from the group consisting of poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(methyl methacrylate-isoprene), poly(ethyl methacrylate-isoprene), poly(propyl methacrylate-isoprene), poly (butyl methacrylate-isoprene), poly(methyl acrylate-isoprene), poly(ethyl acrylate-isoprene), poly(propyl acrylate-isoprene) and poly(butyl acrylate-isoprene).

Examples of styrene/acrylic latex emulsions include poly (styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid); the latex contains a resin selected from the group consisting of poly(styrene-butadiene), poly(methylstyrene-butadiene), poly(styrene-isoprene), poly(methylstyrene-isoprene), poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), and poly(styrene-butyl acrylate-acrylononitrile-acrylic acid).

Examples of specific acrylic latex emulsions suitable for use herein include RHOPLEX® HA-12 & RHOPLEX® I-2074 available from Rohm & Haas, Co. Examples of styrene/acrylic latex emulsions include ACRONAL S728, ACRONAL NX4533 and ACRONAL S888S from BASF. Water based acrylic or styrene/acrylic emulsions may be self-crosslinking and/or alkali soluble and supplied on the acid side (un-neutralized).

Examples of suitable polyester latex emulsions include polyethylene-terephthalate, polypropylene-terephthalate, polybutylene-terephthalate, polypentylene-terephthalate, polyhexalene-terephthalate, polyheptadene-terephthalate, polyoctalene-terephthalate, polyethylene-sebacate, polypropylene sebacate, polybutylene-sebacate, polyethylene-adipate, polypropylene-adipate, polybutylene-adipate, polypentylene-adipate, polyhexalene-adipate, polyheptadene-adipate, polyoctalene-adipate, polyethylene-glutarate, polypropylene-glutarate, polybutylene-glutarate, polypentylene-glutarate, polyhexalene-glutarate, polyheptadene-glutarate, polyoctalene-glutarate polyethylene-pimelate, polypropylene-pimelate, polybutylene-pimelate, polypentylene-pimelate, polyhexalene-pimelate, polyheptadene-pimelate, poly(propoxylated bisphenol-fumarate), poly(propoxylated bisphenol-succinate), poly(propoxylated bisphenol-adipate) and poly(propoxylated bisphenol-glutarate).

In embodiments, the coating may include one or more latex emulsions in a total amount from about 40 weight percent to about 95 weight percent, such as from about 50 weight percent to about 90 weight percent or from about 60 weight percent to about 90 weight percent. If one or more latex emulsions is utilized, each latex emulsion may be present in an amount from about 1 weight percent to about 94 weight percent of the coating, such as from about 5 weight percent to about 90 weight percent or from about 10 weight percent to about 85 weight percent of the coating. Each latex emulsion may be present in any amount as long as the total amount of the latex emulsion in the coating is within the desired range and has the desired $T_g$.

The coating disclosed herein further includes at least one amino alcohol or at least one alkali base.

At least one amino alcohol refers to, for example, from 1 to about 10 amino alcohols that are combined, such as from 1 to about 5 amino alcohols or from 1 to about 3 amino alcohols, in the coating composition. An amino alcohol refers, for example, to a compound having amino group(s) associated with an alkyl alcohol or an aryl alcohol. For example, the alkyl alcohol may include from about 1 to about 36 carbon atoms, such as from about 1 to about 30 carbon atoms or from about 1 to about 15 carbon atoms. An alkyl alcohol may be linear, branched or cyclic and includes, for example, methanol, ethanol, propanol, isopropanol and the like. Aryl alcohols may include from about 6 to 36 carbon atoms, such as from about 6 to about 30 carbon atoms or from about 6 to about 15 carbon atoms. An aryl alcohol includes, for example, cyclobutyl, cyclopentyl, phenyl and the like. One or more amino groups refers to, for example, from about 1 to about 10 amino groups, such as from 1 to about 5 amino groups or from 1 to about 3 amino groups.

Examples of the amino alcohol include, 2-aminoethanol, 2-aminopropanol, 2-aminobutanol, 2-aminohexanol, 2-methyl-2-aminoethanol, 2-methyl-2-aminoethanol, 2-methyl-2-aminopropanol, 2-ethyl-2-aminoethanol, 2-ethyl-2-aminopropanol, 1-amino-2-propanol, 1-amino-2-butanol, 1-amino-2-pentanol, 3-amino-2-butanol, 2-amino-1,3-propanediol, 2-amino-2-ethyl-1,3-propanediol, 3-amino-1,2-propanediol and tris-(hydroxymethyl)-aminomethane, triisopropanolamine and 2-dimethylamino-2-methyl-1-propanol and similar substances.

At least one alkali base refers to, for example, from 1 to about 10 alkali bases that are combined, such as from 1 to about 5 alkali bases or from 1 to about 3 alkali bases, in the coating composition. Examples of alkali base include KOH, LiOH, RbOH, CsOH, NaOH and the like.

The coating may include an amino alcohol or alkali base in an amount from about 1 weight percent to about 5 weight percent, such as from about 1 weight percent to about 4 weight percent or from about 1 weight percent to about 3 weight percent, of the coating.

The coating includes at least one surfactant. At least one surfactant refers to, for example, from 1 to about 10 surfactants that are combined, such as from 1 to about 5 surfactants or from 1 to about 3 surfactants, in the coating composition. This additional surfactant is not inclusive of the surfactant that may be included in the original latex emulsions. The surfactant added to the coating may be included to assist in adjusting the surface tension of the coating as more fully discussed below. Suitable surfactants for use herein include anionic surfactants, nonionic surfactants, silicone surfactants and fluorosurfactants.

Anionic surfactants may include sulfosuccinates, disulfonates, phosphate esters, sulfates, sulfonates, and mixtures thereof.

Examples of nonionic surfactants include polyvinyl alcohol, polyacrylic acid, isopropyl alcohol, acetylenic diols, octyl phenol ethoxylate, branched secondary alcohol ethoxylates, perfluorobutane sulfonates and alcohol alkoxylates.

Silicone surfactants are well known in the art and include polyether modified poly-dimethyl-siloxane and the like.

Examples of fluorosurfactants suitable for use herein may include ZONYL® FSO-100 (E.I. Du Pont de Nemours and Co., Wilmington, Del.), having the formula $R_fCH_2CH_2O(CH_2CH_2O)xH$, wherein $R_f$=$F(CF_2CF_2)y$, x=0 to about 15, and y=1 to about 7, FLUORADS® FC430, FC170C, FC171, and the like, available from 3M, ethoxylated nonyl phenol from Aldrich, and the like.

The coating composition usually includes one or more surfactants in a total amount from about 0.001 weight percent to about 5 weight percent, such as from about 0.001 weight percent to about 4 weight percent or from about 0.001 weight percent to about 3 weight percent, of the coating. The total amount of surfactants in the coating refers to the surfactant added to the coating composition, not to any surfactant found in the latex emulsions. In other words, the amount of total surfactant is not inclusive of any surfactant that may be included in the latex emulsions.

Exemplary latex composition formulations have a surface tension of from about 15 mN/m to about 24 mN/m, such as from about 20 mN/m to about 24 mN/m, as measured at about 25° C. A particular exemplary surface tension is about 22 mN/m as measured at about 25° C.

The viscosity of the compositions in embodiments can be for example, from about 50 cP to about 750 cP at a temperature ranging from about 20° C. to about 30° C. In embodiments, an exemplary viscosity is about 50-750 cP at about 25° C.

Considering surfactants present in the latex emulsions, the total amount of surfactants in the coating may be in the range of from about 0.001 to about 5 weight percent, such as from about 0.001 to about 4 weight percent or from about 0.01 to about 3 weight percent, of the coating composition. The total amount of surfactants in the composition refers to the surfactant added to the composition, not to any surfactant found in the latex emulsions.

The coating disclosed herein may optionally include one or more rheological or viscosity modifiers. One or more viscosity modifiers refers to, for example, from 1 to about 10 viscosity modifiers that are combined, such as from 1 to about 5 viscosity modifiers or from 1 to about 3 modifiers, in the coating composition. Examples of viscosity modifiers include alkali-swellable acrylic thickeners, such as ACRYSOL® ASE-60 (available from Rohm & Haas), ACRYSOL® ASE-75, RHEOLATE® 450 and RHEOLATE® 420, and associative thickeners, such as ELEMENTIS RHEOLATE® 255, RHEOLATE® 216 and RHEOLATE® 1.

The coating may optionally include one or more viscosity modifiers in an amount from about 0.01 weight percent to about 8 weight percent, such as from about 0.01 weight percent to about 5 weight percent or from about 0.1 weight percent to about 5 weight percent, of the coating.

The coating incorporates water in an amount from about 30 weight percent to about 80 weight percent, such as from about 35 weight percent to about 75 weight percent or from about 40 weight percent to about 70 weight percent, of the coating.

In embodiments, further conventional optional additives may include coalescing aids, wax, anti-foaming agents, matting agents, pigments, UV absorbers, biocides, crosslinking agents, and the like.

Substrate

Before the coating is applied, the substrate typically is a type of media such as paper. The media often is gloss coated, cast coated, matte, or silk or is coated SBS packaging. When a latex film-forming material is used, the substrate may be uncoated media.

Haze Detection and Analysis

One of the tools developed to assist the formulation of coatings required to produce defect-free image protection for this invention was a technique using micrographs and image analysis to quantify the haze problem associated with small-scale fuser oil domains dispersed in the continuous coating domain. Haze defects can render a coating not commercially usable. Increased magnification was used to examine haze defects. FIG. 3A shows typical haze in an unsuitable commercial coating applied less than 200 s after the application of fuser oil. At a higher magnification in FIG. 3B, it is evident that the haze is finely dispersed droplets. Coating A, the formulation of Comparative Example 1C below, is shown in FIG. 4A. This coating has unacceptable haze with a haze index of 25% (Xerox test) as shown on FIG. 5 as substrate 4, and 55 gloss units as measured by ASTM D 4039-93. Coating B, the formulation of Example 1 below, is shown in FIG. 4B. This coating has an acceptable level of haze with a haze index of 10% (Xerox test) as shown on FIG. 5 as substrate 4 and 35 gloss units as measured by ASTM D 4039-93. It is noted that the vertical ridges shown in the images are associated with a liquid film split pattern on the lab coater.

As indicated above, in Xerographic printing, the print image contains a non-volatile low surface tension (e.g., usually less than about 22 mN/m) liquid film present at the print/air interface, typically fuser oil, which may continuously cover the surface entirely or be discontinuous in domains ranging in size from microns to centimeters. Typical area densities of this liquid film are substantially less than 1 g/m2. The low energy surface film domains are normally subject to diffusion and capillary forces so that they tend to penetrate into the substrate over time. When a film of liquid coating, typically 2-10 g/m2, is applied to the print image between 50 ms and 200 s after the print image exits the fusing nip, the low surface tension liquid is trapped between coating film and print image. In some cases the coating film will retract from large domains of the low surface tension film resulting in pinholes. In a more complex case, droplets of the low surface tension will be dispersed as a discontinuous phase in the coating film, resulting in a haze problem for certain coating compositions.

In order to test the haze of a sample, a small piece was cut from a coated print over a solid image region. The sample was substantially free of defects such as pinholes, scratches, fingerprints, film split patterns etc. The sample was secured, coated side up, on a microscope slide and examined under a standard optical microscope under reflected light using magnification approximately 1.25 ocular×10× objective. The microscope was equipped with a camera to secure an image of the observed surface for image analysis. Standard image analysis filters were combined to isolate and quantify the haze feature of interest in the micrograph yielding the haze index value plotted on the y-axis of the graph.

FIG. 5 is a graph showing the haze index for coatings A and B for five different coated papers. The y-index is a measure of haze obtained by taking a low magnification reflected light surface micrograph of the coated print and performing image analysis on it using a filter developed to isolate the haze feature and assign it a quantitative value corresponding to the relative surface area (pixels) it occupies, i.e. high number=high haze level. The top line (coating A) indicates a poor coating for haze compared to the bottom line (coating B). Another desirable feature for an acceptable coating is that it demonstrates low haze values over a range of substrates. Coating A shows more substrate dependence than coating B, indicating that coating B is better than coating A. "Haze measurement" as described herein refers to the use of image analysis on coated surface micrographs to identify and quantify the presence of oil droplets in the coating phase, which results in a cloudy appearance in high gloss coating films. Generally stated, suitable coatings have a haze measurement of no more than 40 gloss units when measurements are made according to ASTM 4039-93 24 hours after application. This corresponds to a haze index of about 15%.

In FIG. 5, substrate type 1 is intermediate quality gloss coated paper, type 2 is lower quality coated container board, type 3 is high quality cast coat high gloss paper, type 4 is high quality gloss paper, and type 5 is another intermediate quality gloss coated paper. The vertical bars on the graph denote 95% confidence levels.

The following examples show certain embodiments and are intended to be illustrative only. The materials, conditions, process parameters and the like recited herein are not intended to be limiting.

Example 1

An apparatus was assembled including a Euclid offset gravure lab coater positioned to receive coated or uncoated paper (type of media) sheets hand-fed from the exit of a Xerox iGen3 fuser nip operating at approximately 500 mm/s process speed. The iGen3 fuser was connected to a paper delivery unit for non-imaged 75 gsm 4200 paper. In a typical experimental run, 50 sheets of 4200 paper were run through the fuser to stabilize the fuser oil metering system and then an unfused image on a selected substrate was tipped through fusing the test image. Immediately upon exit from the fusing nip, the image sheet was picked up by hand, taped to a leader sheet and passed through the coating nip of the Euclid coater receiving an application of test coating. The sheet was then manually fed to a UV Fusion curing station for drying and/or curing of the applied coating. A critical parameter was that the time from fuser nip exit to application of coating did not exceed 3 seconds.

The Euclid coater operated with a 220 lpi gravure roll for UV curable coatings and a 140 lpi gravure roll for aqueous coatings. The doctor blade pressure was 25 psi. The offset roll was EPDM rubber. Roll speeds were typically run at 30% gravure, 100% offset. Immediately after exiting the fuser nip, sheets were taped to a leader sheet which was then fed into the coating nip at the same time the backing roll was lowered. The leader sheet took up the acceleration of the sheet through the coating nip ensuring uniform coating quality.

The coated sheet was manually retrieved as it left the coating nip and placed on the conveyor of a fusion UV curing station. For evaluation of curable coating the UV station resulted in polymerization cure, and for aqueous coatings heat from the lamps achieved successful drying. The Euclid coater and the UV station ran at approximately 500 mm/sec process speed.

The procedure described above was used to prepare coated iGen3 images containing approximately 10 mg/sheet amino-functionalized polydimethylsiloxane fuser oil. The images were coated with a coating having Formulation 1 shown below between 3 s and 5 s after leaving the fusing subsystem with an approximately 5 microns wet coating film thickness. The coating films were cured using a FusionUV lamp.

Formulation 1

| Wt % | Component | Source |
|---|---|---|
| 68.91 | Amine Modified Polyester acrylate | Cytec EBECRYL ® 81 |
| 22.97 | Amine Modified Polyester Tetracrylate | Cytec EBECRYL ® 80 |
| 4.8 | UV photoinitiator | CIBA Geigy Irgacure 184 |
| 0.3 | UV photoinitiator | CIBA Geigy TPO-L |
| 3 | Surfactant | BYK UV3510 (BYK-Chemie) |

This composition succeeded in both wetting the print without pinholes and remaining substantially free of time dependent haze. The haze index was less than 10%.

Example 2

The procedure of Example 1 was repeated with the exception that 0.5 parts by weight (based upon 100 parts of the composition of formulation 1) defoamer BYK 088 (BYK-Chemie) was added. The results were comparable to those of Example 1.

Comparative Examples 1A-1C

Images were printed on gloss coated sheets using an iGen3 machine. The printed sheets contained about 10 mg/sheet of amino-functionalized polydimethylsiloxane fuser oil. Three to five seconds after leaving the fusing subsystem, the sheets were coated with the compositions Control A-Control C shown below using a gravure offset coater (Euclid Coating Systems) with a 220 lip gravure roll and EPDM transfer roll applying the coating in a wet thickness of 5 microns. The coatings were cured using a Fusion UV lamp (Fusion US Systems, Inc.). The condition of each coating is described below its formulation.

Comparative Example 1A

| Wt. % | Component | Source |
|---|---|---|
| 73.4 | Amine-modified polyether acrylate oligomer | BASF Laromer ® PO94F |
| 21.0 | Propoxylated neopentyl glycol diacrylate (monomer) | Sartomer SR9003 |
| 4.8 | UV photoinitiator | CIBA Geigy Irgacure 184 |
| 0.3 | UV photoinitiator | CIBA Geigy TPO-L |
| 0.6 | surfactant | Dow Paint Additive 57 |

This composition did not wet the prints, resulting in severe pinhole defects; when the PA57 surfactant was raised post-add to 5% wetting was achieved but the composition foamed excessively.

Comparative Example 1B

| Wt. % | Component | Source |
|---|---|---|
| 73.4 | Amine-modified polyether acrylate oligomer | BASF Laromer ® PO94F |
| 21.0 | Propoxylated neopentyl glycol diacrylate (monomer) | Sartomer SR9003 |
| 4.8 | UV photoinitiator | CIBA GeigyIrgacure 184 |
| 0.3 | UV photoinitiator | CIBA Geigy TPO-L |
| 3 | surfactant | Tego 270 |

This composition did not wet the prints, resulting in pin-hole defects.

Comparative Example 1C

| Wt. % | Component | Source |
|---|---|---|
| 69.9 | Amine-modified polyether acrylate oligomer | BASF Laromer ® PO94F |
| 20 | Propoxylated neopentyl glycol diacrylate (monomer) | Sartomer SR9003 |
| 4.8 | UV photoinitiator | CIBA Geigy Irgacure 184 |
| 0.3 | UV photoinitiator | CIBA Geigy TPO-L |
| 5 | surfactant | BYK UV3510 (BYK-Chemie) |

This composition wet the prints without pinholes; however after several hours a severe haze defect was observed.

Example 3

The procedure of Example 1 was repeated with the exception that the 220 lpi gravure roll was replaced by a 160 lpi gravure roll to take into account the non-active (water) component of the coating and the aqueous latex based system shown below as Formulation 2 was used. The applied coating was dried using radiant heat supplied by the FusionUV lamps. The dry coating film was approximately 2 microns thick.

Formulation 2

| | | Wt % Wet | Wt % Dry |
|---|---|---|---|
| Acrylic emulsion | Rohm & Haas Rhoplex HA12 | 64.8 | 29.2 |
| Acrylic emulsion | Rohm & Haas Rhoplex I-2074 | 21.9 | 6.6 |
| Viscosity modifier (thickener) | Rohm & Haas Acrysol ASE-60 | 3.6 | 1 |
| Amino alcohol | Dow AMP-95 | 3.4 | 3.4 |
| Viscosity modifier | Elementis Rheolate 450 | <0.1 | <0.1 |
| Surfactant | Air Products Surfynol 504 | 0.6 | 0.6 |
| Surfactant | 3M Novec FC4432 | 0.1 | 0.1 |

In this example total surfactant is 1.9% of dry polymer. This composition succeeded in both wetting the print without pinholes and remaining free of time dependent haze.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A xerographic print comprising a substrate with a toner-based image printed thereon, the printed substrate including low surface tension portions having a surface tension of no more than about 22 mN/m at 25 Deg. C. resulting in a surface tension gradient field on the printed substrate, the printed substrate being coated with a coating composition comprising at least one acrylic emulsion, at least one amino alcohol or at least one alkali base, and at least one surfactant, and having a viscosity of from about 50 cP to about 750 cP at about 25° C. before drying, the coating having a liquid phase surface tension at 25 Deg. C. not exceeding the surface tension of the low surface tension portions of the printed substrate by more than about 2 mN/m, the coating having substantially no pinholes and being sufficiently resistant to permeation by the fuser oil to exhibit an effective absence of haze 24 hours after application.

2. The xerographic print of claim 1, wherein the coating has a change in haze in accordance with ASTM-D 4039-93 of no more than 40 gloss units during the first 24 hours after the coating is hardened.

3. The xerographic print of claim 1, wherein at least some of the low surface tension portions of the image and substrate have fuser oil thereon.

4. The xerographic print of claim 1, wherein the coating has a haze index of no more than 15%.

5. The xerographic print of claim 1, wherein the coating is applied in an amount between 1 and 10 g/sm to the print image.

6. The xerographic print of claim 1, wherein the surfactant comprises a polyether modified polydimethylsiloxane.

7. The xerographic print of claim 3, wherein the coating has a change in haze in accordance with ASTM-D 4039-93 of no more than 40 gloss units during the first 24 hours after the coating is hardened.

8. The xerographic print of claim 3, wherein the coating has a haze index of no more than 15%.

9. The xerographic print of claim 3, wherein the coating is applied in an amount between 1 and 10 g/sm to the print image.

10. The xerographic print of claim 3, wherein the surfactant comprises a fluorosurfactant.

11. The xerographic print of claim 3, wherein the surfactant comprises a polyether modified polydimethylsiloxane.

12. The xerographic print of claim 1, wherein the acrylic emulsion comprises at least one member selected from the group consisting of poly(alkyl methacrylate-alkyl acrylate), poly(alkyl methacrylate-aryl acrylate), poly(aryl methacrylate-alkyl acrylate), poly(alkyl methacrylate-acrylic acid), poly(alkyl acrylate-acrylonitrile-acrylic acid), poly(styrene-alkyl acrylate), polystyrene-1,3-diene), poly(styrene-alkyl methacrylate), poly(styrene-alkyl acrylate-acrylic acid), polystyrene-1,3-diene-acrylic acid), poly(styrene-alkyl methacrylate-acrylic acid), poly(styrene-alkyl acrylate-acrylonitrile-acrylic acid), and poly(styrene-1,3-diene-acrylonitrile-acrylic acid).

13. A xerographic print comprising a substrate with a toner-based image printed thereon, the printed substrate including low surface tension portions having a surface tension of no more than about 22 mN/m at 25 Deg. C. resulting in a surface tension gradient field on the printed substrate, the printed substrate being coated with a coating composition comprising at least one acrylic emulsion, at least one amino alcohol or at least one alkali base, and at least one surfactant, and having a viscosity of from about 50 cP to about 750 cP at about 25° C. before drying the coating having a liquid phase surface tension at 25 Deg. C. that is less than the surface tension of the low surface tension portions, the coating being sufficiently resistant to permeation by the fuser oil to exhibit an effective absence of haze 24 hours after application.

14. The xerographic print of claim 13 wherein the coating has a change in haze in accordance with ASTM-D 4039-93 of no more than 40 gloss units during the first 24 hours after the coating is hardened.

15. The xerographic print of claim 13 wherein at least some of the low surface tension portions of the image and substrate have fuser oil thereon.

16. The xerographic print of claim 13 wherein the coating has a haze index of no more than 15%.

17. The xerographic print of claim 13 wherein the coating is applied in an amount between 1 and 10 g/sm to the print image.

18. The xerographic print of claim 13, wherein the surfactant comprises a fluorosurfactant.

* * * * *